United States Patent [19]
Tamba et al.
[11] Patent Number: 4,946,482
[45] Date of Patent: Aug. 7, 1990

[54] DUST REMOVING APPARATUS FOR AIR CLEANER

[75] Inventors: Shinichi Tamba, Kakogawa; Hitomi Miyake, Kobe; Hiromu Tanaka, Akashi, all of Japan

[73] Assignee: Kawasaki Jukogyo Kabushiki Kaisha, Japan

[21] Appl. No.: 327,394

[22] Filed: Mar. 22, 1989

Related U.S. Application Data

[63] Continuation of Ser. No. 105,046, Oct. 6, 1987, abandoned.

[30] Foreign Application Priority Data

Oct. 15, 1986 [JP] Japan ................................ 62-245018

[51] Int. Cl.[5] .......................... F01P 5/06; B01D 36/00

[52] U.S. Cl. ......................................... 55/320; 55/332; 55/398; 55/418; 55/431; 55/DIG. 28; 123/41.58; 123/41.65

[58] Field of Search .................. 55/320, 321, 322, 323, 55/325, 332, 337, 394, 398, 418, 431, DIG. 28, 430, 315, 437; 123/41.58, 41.65, 198 E

[56] References Cited

U.S. PATENT DOCUMENTS

| | | | |
|---|---|---|---|
| 394,240 | 12/1888 | Allington et al. | 55/394 |
| 926,206 | 6/1909 | Morse | 55/459.1 |
| 1,029,214 | 6/1912 | Morse | 55/418 |
| 1,530,645 | 3/1925 | Brockway | 55/431 |
| 1,591,677 | 7/1926 | Garner | 55/431 |
| 2,290,664 | 7/1942 | Allardice | 55/398 |
| 2,886,129 | 5/1959 | Streete | 55/337 X |
| 3,443,364 | 5/1969 | Saltsman | 55/459.1 |
| 3,641,744 | 2/1972 | Culbert et al. | 55/337 X |
| 3,731,467 | 5/1973 | Jennings | 55/432 |
| 4,006,000 | 2/1977 | Tortorici et al. | 55/DIG. 28 |
| 4,233,043 | 11/1980 | Catterson | 55/315 |
| 4,276,067 | 6/1981 | Lindman | 55/337 |
| 4,537,160 | 8/1985 | Shirai | 55/320 |

FOREIGN PATENT DOCUMENTS

| | | | |
|---|---|---|---|
| 837786 | 3/1952 | Fed. Rep. of Germany | 55/431 |
| 2649215 | 5/1977 | Fed. Rep. of Germany | 55/431 |
| 50126 | 11/1981 | Japan . | |
| 750118 | 7/1980 | U.S.S.R. | 55/320 |

*Primary Examiner*—Jeffery Thurlow
*Assistant Examiner*—Mathieu Vargot
*Attorney, Agent, or Firm*—Leydig, Voit & Mayer

[57] ABSTRACT

A dust removing apparatus for an intake air cleaner in which the air cleaner is disposed in the vicinity of a passage of a high speed air flow and an opening in a wall of the air passage confronting high speed air flow within the passage. As a result dust is removed from the high speed air flow.

11 Claims, 3 Drawing Sheets

DUST REMOVING APPARATUS FOR AIR CLEANER

This application is a continuation of application Ser. No. 07/105,046 filed Oct. 6, 1987, now abandoned.

BACKGROUND OF THE INVENTION

The present invention relates to apparatus for removing dust from intake air for an internal combustion engine.

Japanese Utility Model Examined Publication No. 50126/81 shows an example of a full cyclone type air cleaner including an annular swirl chamber. During a swirl motion of the intake air in the swirl chamber, dust entrained in the air is discharged through a passage at the perimeter of the swirl chamber by a cyclone effect.

However, a conventional full cyclone type air cleaner must have a large swirl chamber to provide an air passage extending to a filter downstream of the swirl chamber. This makes the passage structure unduly large and complicated. Therefore, a conventional cyclone air cleaner suffers from disadvantages in that intake air passage flow resistance is increased, and the complicated overall structure would require high costs. Also, the opening for the dust discharge must be large so intake noise is reduced. Furthermore, it would be impossible to discharge the dust retained at corner portions of the air passage.

SUMMARY OF THE INVENTION

To overcome the above drawbacks, the dust removing apparatus of the present invention, comprises an air cleaner, disposed in the vicinity of a passage through which high speed intake air flows and an opening in a wall of the air passage confronting the high speed intake air flow whereby, dust is removed from the high speed cooling air flow.

A dust discharge port opening may be in the form of an ejector nozzle protecting into a high speed cooling air flow passage. The intake air passage upstreams of the filter element includes a curved portion and the opening may be in a wall of the curved portion. Dust mixed in the intake air is separated from the intake air in the curved portion and removed by the high speed cooling air flow.

DESCRIPTION OF THE PREFERRED EMBODIMENTS

A preferred embodiment of the invention will now be described with reference to FIGS. 1 to 6.

Figure 5:
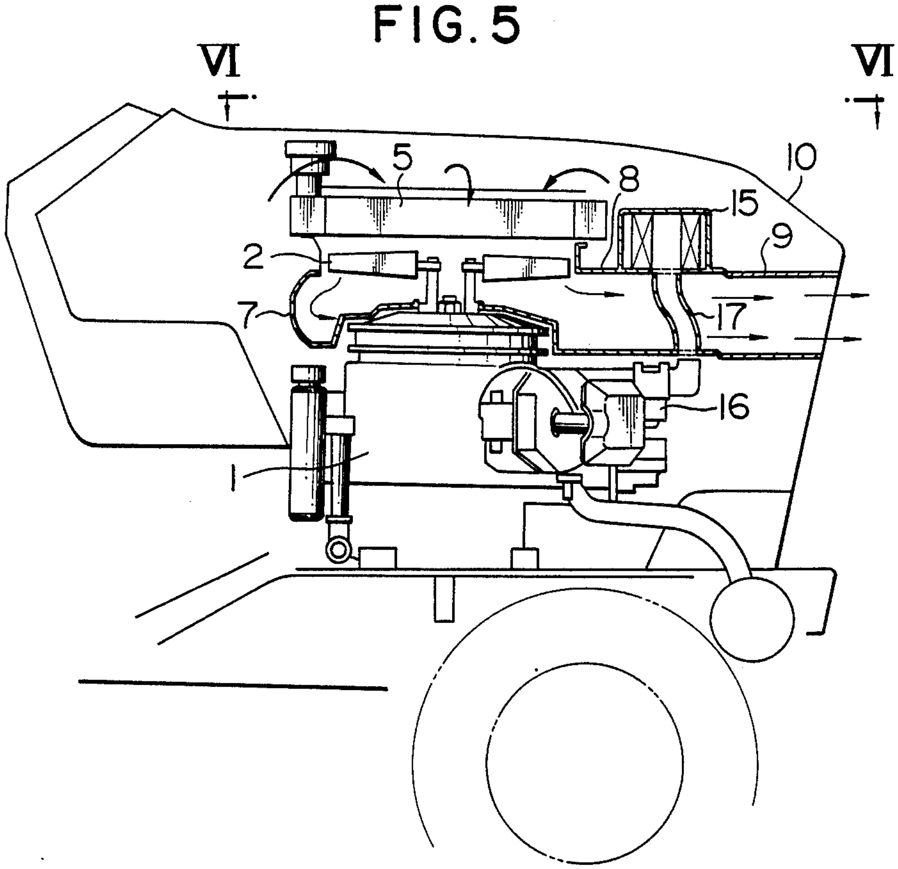
FIG. 5 is a partial side view showing an automotive vehicle with the air cleaner shown in FIG. 1.

As shown in FIG. 5, an engine 1 is mounted in forward portion of a small vehicle. A cooling fan 2 is arranged horizontally on the upper side of the engine 1. A radiator 5 is arranged horizontally above the cooling fan 2. A cover 7 for the cooling fan 2 is provided on the lower side of the radiator 5. A cooling air duct 8 is adapted to extend substantially horizontally forward from a front portion of the cover 7. The cooling air duct 8 is connected at its front end to another duct 9 which is adapted to extend substantially horizontally to a front end face of an automative bonnet or hood 10. An air cleaner 15 is provided horizontally on the cooling air duct 8. An intake air pipe 17 extends from a central bottom portion of the cooling air duct 8 to a carburetor 16 disposed on the lower side.

Figure 6:
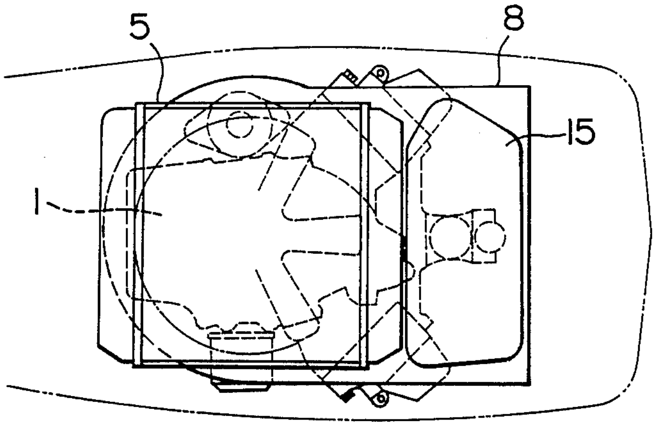
FIG. 6 is a perspective view as viewed in the direction VI—VI of FIG. 5.

As best shown in FIG. 6, a width of the cooling air duct 8 is substantially equal to that of the engine 1 or the radiator 5. The air cleaner 15 extends in the transverse direction of the vehicle so that its length is somewhat shorter than the width of the cooling air duct 8.

Figure 1:
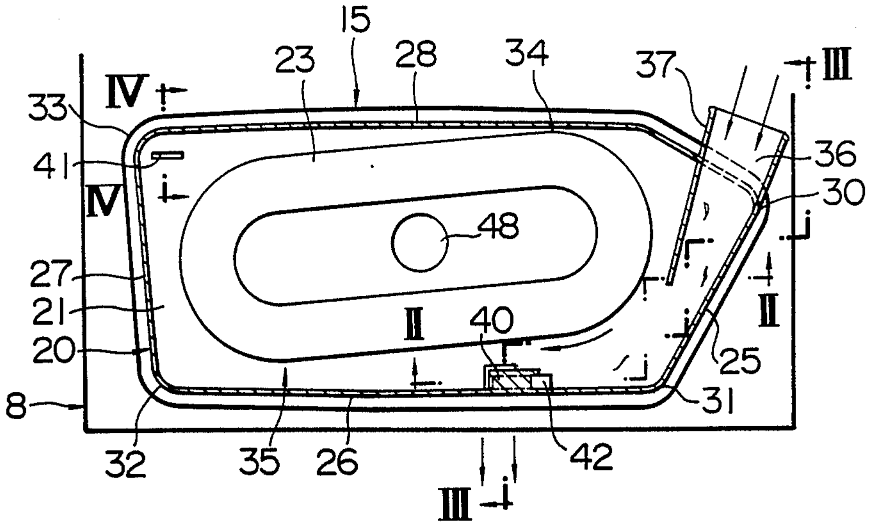
FIG. 1 is a horizontal cross-sectional view showing an embodiment of the invention.
Figure 2:
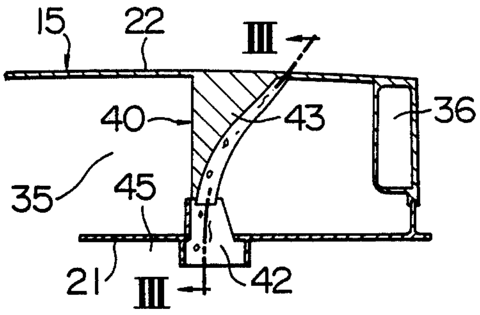
FIG. 2 is a cross-sectional view taken along the line II—II of FIG. 1.

As shown in FIG. 1, a casing of the air cleaner 15 has a peripheral wall 20, a bottom wall 21 and a top wall 22 (FIG. 2). A substantially rectangular filter element 23 is disposed horizontally in an interior of the casing. The peripheral wall 20 is substantially rectangular with four wall portions 25, 26, 27 and 28 and four corner portions 30, 31, 32 and 33. It should be noted that the corner portion 30 (i.e., the left and rear corner portion with respect to the vehicle) is more projected to the outside than the front corner portion 31, so that the left wall portion 25 is inclined with respect to the longitudinal direction of the vehicle with the left front corner portion 31 forming an obtuse angle on its inner surfaces.

The above-described filter element 23 is disposed in a somewhat inclined manner with respect to the peripheral side wall 20. A part of the filter element 23 is located in the vicinity of the inner surface of the wall portion 28 at a position 34 close to the corner portion 30. As a result, an air passage 35 between the filter element 23 and the peripheral wall 20 is formed substantially in a C-shape from the vicinity of the corner portion 30 to the vicinity of the corner portion 33. The passage portions in the vicinities of the corner portions 31, 32 and 33 are curved or bent.

An inlet port 36 of the above-described air passage 35 is provided in the vicinity of the corner portion 30. An inlet wall portion 37 that forms the inlet port 36 extends from the outside of the peripheral wall 20 through the corner portion 30 to a midportion of the air cleaner 15 with respect to the longitudinal direction of the vehicle.

A dust receiver 40 is provided on an inner surface of the front wall portion 26 so that the dust receiver 40 projects into the passage 35. The dust receiver 40 is located close to the corner portion 31 and is formed by a wall portion opened toward the corner portion 31. A dust discharge port 41 in the form of a slit is formed in the vicinity of the corner portion 33.

As best shown in FIG. 2, an inner surface of a downstream end wall portion 43 of the dust receiver 40 is curved or inclined so as to guide the dust entrained in the dust receiver 40, downward.

Figure 3:
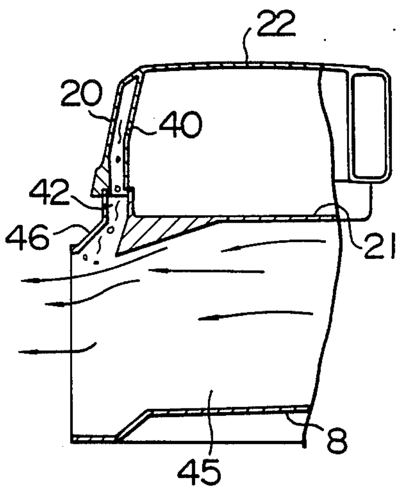
FIG. 3 is a cross-sectional view taken along the line III—III of FIGS. 1 and 2.

As shown in FIG. 3, the bottom wall 21 is made of the same material as that of the top wall of the cooling air duct 8. The dust discharge port 42 is in communication with a high speed cooling air flow 45 within the cooling air duct 8. The dust discharge port 42 is formed by an ejector nozzle 46. The ejector nozzle 46 is made of a wall portion projecting downwardly from the bottom wall 21 into the cooling air passage 45. The dust discharge port 42 is opened obliquely downward on the downstream side of the cooling air passage 45 in a tapered manner.

Figure 4:
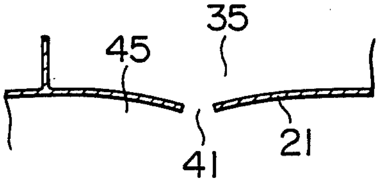
FIG. 4 is a cross-sectional view taken along the line VI—VI of FIG. 1.

As shown in FIG. 4, the other dust discharge port 41 is also in communication with the cooling air passage 45 formed under the dust discharge port 41. The opposite wall portions of the dust discharge port 41 are somewhat inclined to project into the cooling air passage 45.

With such an arrangement, in FIG. 1, the air introduced from the inlet port 36 into the air passage 35 passes through the filter element 23 to reach the outlet 48 inside the filter element 23. The air is further supplied to the carburetor 16 through the pipe 17 shown in FIG. 5. During this operation, the dust entrained in the air is removed while flowing through the air passage 35 shown in FIG. 1, in the following fashion.

The air introduced from the inlet 36 into the air passage 35 is first allowed to flow to the vicinity of the corner portion 31 along the wall portion 25 and to deflect its flow direction in the vicinity of the corner portion 31 toward the corner portion 32. When the air flow is thus deflected, the dust in the air is moved toward the corner portion 31 by centrifugal force and introduced into the dust receiver. Then, the dust is guided by the end wall portion 43 shown in FIG. 2 and discharged from the dust discharge port 42 to the cooling air passage 45. During this operation, since cooling air fed from the cooling fan 2 (in FIG. 5) flows at a high speed and the discharge port 42 serves as a nozzle opening of the ejector nozzle 46, the dust is discharged from the dust discharge port 42 into the cooling air passage 45 by the ejector effect. Therefore, the dust removing effect of the dust receiver 40 is enhanced.

A portion of the dust flows between the dust receiver 40 and the filter element 23 toward the corner portion 32 and is deflected in the vicinity of the corner portion 32 toward the corner portion 33. Then, the dust is allowed to fall through the dust discharge port 41 to the cooling air passage 45.

As described above, according to the present invention, the dust in the intake air may be discharged by the high speed cooling air flow. Furthermore, the discharged dust may be blown away by the high speed air flow preventing the dusts from again entering the air cleaner 15. The intake air flow speed within the air cleaner 15 may be increased, and the dust separation effect enhanced by the cyclone effect. Since there is a high freedom in locating the dust discharge ports 41 and 42 and also the high speed cooling air flow is utilized, it is possible to reduce the air discharge effect of one dust discharge port even if a plurality of dust discharge ports 41, 42 are provided.

In the arrangement in which the ejector nozzle 46 is provided on the dust discharge port 42 dust discharged is further enhanced and the dust can be removed from the intaken air even with a relatively slow intake air flow.

In the arrangement in which the dust discharge port 41 is provided in the curved wall of the air passage it is possible to further enhance the dust separation effect. Also, another advantage is that clogging of the discharge port 41 is suppressed. Since the size of the discharge port 41 may be small air intake noise may be suppressed.

Figure 7:
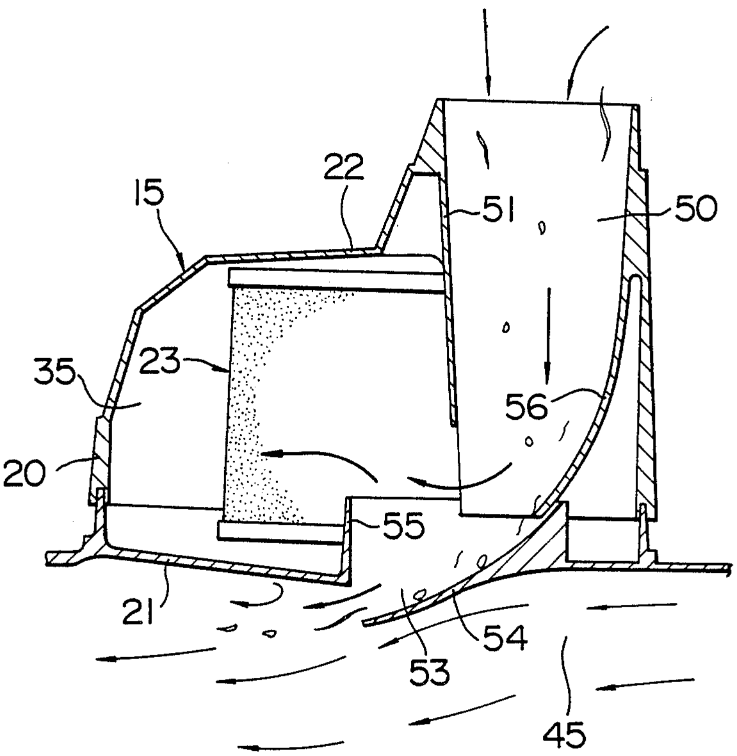
FIG. 7 is a vertical cross-sectional view showing a primary part of another embodiment of the invention.

Another embodiment of the invention will now be described with reference to FIG. 7 in which an inlet 50 is formed at a rear left end portion of the top wall 22. An inlet wall portion 51 surrounding the inlet 50 is formed to project upwardly with its lower portion being inserted to a midportion of the air passage 35 in the vertical direction. A dust discharge port 53 is formed in bottom wall 21 and is located somewhat downstream than the inlet 50. The dust discharge port 53 is also formed by a nozzle opening of an ejector nozzle 54 projecting into the cooling air passage 45. At a front edge of the dust discharge port 53, a dust receiver 55 is formed by an upwardly projecting wall portion. A rear inner surface 56 of the inlet wall portion 51 is bent to be substantially continuous with an inner surface of the ejector nozzle 54. In this embodiment the dust is discharged from the curved portion through the dust discharge port 53 into the cooling air.

We claim:

1. An air cleaner for an engine comprising:

a hollow casing having an air inlet, an air outlet, and an inner surface;

an air filter which is housed inside said casing surrounding said air outlet and which has an outer surface which together with the inner surface of said casing forms an air passage which is connected to said air inlet and generally decreases in cross-sectional area downstream of said air inlet, the inner surface of said casing having a non-straight portion in its inner surface which changes the direction of flow of air that flows along said air passage; and a dust receiver which is formed in a surface of said casing in a location downstream of where the direction of flow of air has been changed by said non-straight portion of the inner surface of said casing, said dust receiver comprising a discharge port extending outside of said casing into an external passage through which there is a high-speed air flow and a dust-guiding surface which is formed as an end wall portion of said dust receiver and extends inwards from the inner surface of said casing adjacent said discharge port and guides particles in a direction transverse to the direction of air flow through the air passage into said discharge port.

2. An air cleaner as claimed in claim 1 wherein said air inlet comprises a curved passage of decreasing cross-sectional area having an inlet which opens onto the outside of said casing, an outlet which opens into said external passage, and an opening between said inlet and said outlet which opens into said casing, the cross-sectional area of said outlet being smaller than the cross-sectional area of said inlet or said opening.

3. An air cleaner as claimed in claim 1 wherein said discharge port of said dust receiver comprises a slit which is formed in a surface of said casing, said slit having curved sides whose ends extend into said external passage.

4. An air cleaner as claimed in claim 1 wherein said casing has a plurality of straight sides and said non-straight portion is a corner where two of said straight sides meet.

5. An air cleaner as claimed in claim 1 wherein said air inlet comprises a tube of decreasing cross-sectional area which extends into said casing towards said non-straight portion of the inner surface of said casing, said tube being integral with a surface of said casing.

6. An air cleaner as claimed in claim 1 wherein a portion of said filter comes into close proximity with the inner surface of said casing downstream of said air passage of decreasing cross-sectional area so as to substantially block the flow of air.

7. An air cleaner comprising:

a hollow casing having an air inlet, an air outlet, and an inner surface;

an air filter which is housed inside said casing and which surrounds said air outlet, said air filter having an outer surface which together with the inner surface of said casing forms an air passage which is connected to said air inlet and generally decreases in cross-sectional area downstream of said air inlet, the inner surface of said casing having a non-straight portion which changes the direction of flow of air that flows along said air passage;

a cooling fan;

mean for driving said cooling fan;

a duct through which air is blown at a high speed by said cooling fan, said duct adjoining an outer surface of said casing; and a dust receiver which is formed in a surface of said casing in a location downstream of where the direction of flow of air has been changed by said non-straight portion, said dust receiver comprising a discharge port extending outside of said casing into said duct downstream of said cooling fan and a dust-guiding surface which is formed as and end wall portion of said dust receiver and extends inwards from the inner surface of said casing adjacent said discharge port and guides particles in a direction transverse to the direction of air flow through the air passage into said discharge port.

8. An air cleaner as claimed in claim 7 wherein said outer surface of said casing forms a side of said duct.

9. An air cleaner for an engine comprising:

a cooling fan;

a duct for cooling air having an upper wall, a first end disposed in the proximity of said cooling fan, and a second end which communicates with the atmosphere;

a hollow casing which is mounted on the upper wall of said duct and which has an inner surface, an air inlet, and a bottom wall in which an air outlet is formed;

an air filter which is housed inside said casing surrounding said air outlet and which has an outer surface which together with the inner surface of said casing forms an air passage which is connected to said air inlet and generally decreases in cross-sectional area downstream of said air inlet, the inner surface of said casing having a non-straight portion in its inner surface which changes the direction of flow of air that flows along said air passage; and a dust receiver comprising a discharge port which is formed in the bottom wall of said casing in a location downstream of where the direction of flow of air has been changed by said non-straight portion of the inner surface of said casing and which opens into said duct downstream of said cooling fan and a dust-guiding surface which is formed as an end wall portion of said dust receiver and extends inwards from the inner surface of said casing and downwards to said discharge port to guide dust particles transversely to the direction of air flow through the air passage into said discharge port.

10. An air cleaner as claimed in claim 9, wherein the upper wall of said duct constitutes the bottom wall of said casing, and said discharge port comprises a through hole formed in the upper wall of said duct.

11. An air cleaner as claimed in claim 10 further comprising an ejector nozzle which is formed on an inner surface of said duct adjacent to said discharge port.

* * * * *

UNITED STATES PATENT AND TRADEMARK OFFICE
CERTIFICATE OF CORRECTION

PATENT NO. : 4,946,482

DATED : August 7, 1990

INVENTOR(S) : Tamba et al.

It is certified that error appears in the above-identified patent and that said Letters Patent is hereby corrected as shown below:

Title page:

In item [30] Foreign Application Priority Data change "62-245018" to --61-245018--.

In item [57] Abstract change "and" to --,--.

Signed and Sealed this

Tenth Day of December, 1991

*Attest:*

HARRY F. MANBECK, JR.

*Attesting Officer*

*Commissioner of Patents and Trademarks*